United States Patent [19]

Kobayashi et al.

[11] 4,445,489
[45] May 1, 1984

[54] AIR-FUEL MIXTURE CONTROL FOR AUTOMOBILE ENGINE HAVING FUEL INJECTION SYSTEM

[75] Inventors: Kazuo Kobayashi; Hideki Tanaka; Katsuyoshi Iida; Junji Kamite, all of Aki, Japan

[73] Assignee: Toyo Kogyo Co., Ltd., Hiroshima, Japan

[21] Appl. No.: 294,352

[22] Filed: Aug. 19, 1981

[30] Foreign Application Priority Data

Aug. 25, 1980 [JP] Japan .................. 55-117225
Aug. 25, 1980 [JP] Japan .................. 55-117226
Aug. 27, 1980 [JP] Japan .................. 55-118894
Sep. 4, 1980 [JP] Japan .................. 55-123116

[51] Int. Cl.³ ................................. F02D 37/00
[52] U.S. Cl. ........................ 123/571; 123/486; 123/489; 123/491
[58] Field of Search .............. 123/571, 568, 489, 480, 123/491, 492, 493, 486, 478; 364/431.05, 431.06

[56] References Cited

U.S. PATENT DOCUMENTS 3,906,207  9/1975  Rivere et al. .............. 123/493
4,143,622  3/1979  Klötzner et al. ........... 123/492
4,163,435  8/1979  Nakajima et al. .......... 123/119 A
4,184,458  1/1980  Aoki et al. ................. 123/480
4,195,604  4/1980  Taplin ....................... 123/571
4,276,866  7/1981  Higashiyama ............. 123/571
4,290,107  9/1981  Suda et al. ................. 123/489

FOREIGN PATENT DOCUMENTS 2635325  3/1977  Fed. Rep. of Germany ...... 123/571
50-32327  3/1975  Japan .

Primary Examiner—Andrew M. Dolinar
Attorney, Agent, or Firm—Wenderoth, Lind & Ponack

[57] ABSTRACT

An air-fuel ratio control system for an automobile engine of a type having a fuel injection system wherein at least two of parameters including the engine speed, the opening of a throttle valve and the negative pressure developed inside a fuel intake passage are utilized to detect the rate of flow of incoming air to be mixed with an injected mist of fuel to form a combustible mixture. The amount of fuel to be injected into the intake passage depends on the detected rate of flow of the incoming air. A composition sensor for detecting the concentration of an exhaust gas component is also provided for controlling an EGR control valve for controlling the recirculation of a portion of exhaust gases from an exhaust passage into the intake passage.

5 Claims, 10 Drawing Figures

AIR-FUEL MIXTURE CONTROL FOR AUTOMOBILE ENGINE HAVING FUEL INJECTION SYSTEM

BACKGROUND OF THE INVENTION

The present invention generally relates to an air-fuel mixture control for an automobile engine of a type having a fuel injection system and, more particularly, to an air-fuel mixture control system which is effective to compensate for variations in the air-fuel mixing ratio of a combustible mixture by properly controlling the rate of recirculation of exhaust gases from an engine exhaust system into an engine fuel intake system in dependence on an output signal from a composition sensor which is used for detecting the concentration of a component of the exhaust gases; the concentration is a function of the air-fuel mixing ratio of the combustible mixture burned in the engine.

An automobile engine of a type having a fuel injection system is well known. In this engine, an air-flow meter is installed on a fuel intake passage of the engine at a position upstream of a fuel injection nozzle with respect to the direction of flow of a combustible mixture towards the engine. The air-flow meter is used to detect and generate an output signal which is indicative of the rate of flow of incoming air which is subsequently mixed with an injected fuel to form the combustible mixture; the output signal is utilized to control the rate of supply of fuel to be injected into the engine fuel intake passage through the fuel injection nozzle. The use of the air-flow meter is advantageous in that, since the rate of supply of the fuel can be controlled in dependence on the output signal from the air-flow meter, the air-fuel mixing ratio of the combustible mixture can accurately be controlled. An example of this is disclosed in the Japanese Laid-open Patent Publications No. 53-32232 and No. 53-32233, both laid open to public inspection on Mar. 27, 1978, and corresponding to the U.S. Pat. No. 4,163,435, patented Aug. 7,1979.

However, it has been fairly recognized that, the engine of the type having a fuel injection system requires an increased manufacturing cost because both the fuel injection nozzle and the air-flow meter are expensive.

What appears to substantially eliminate the above described disadvantage is a control system wherein a combination of at least two easily detectable parameters including the engine speed, the negative pressure inside the fuel intake passage and the opening of a throttle valve is utilized in a computer to calculate the rate of supply of incoming air so that the rate of supply of fuel which subsequently mixes with the incoming air can be controlled in correspondence with the rate of supply of the incoming air.

Where an exhaust gas recirculation system for recirculating a portion of the exhaust gases from the exhaust passage back to the intake passage for suppressing the maximum combustion temperature is provided in the engine utilizing a fuel injection system and also utilizing the air-fuel ratio control system wherein at least two parameters are used to compensate for variations in the air-fuel mixing ratio of the combustible mixture, such as taught by the U.S. Pat. No. 4,163,435 in view of the Japanese Laid-open Patent Publication No. 50-32327, laid open to public inspection on Mar. 29,1975, the combustible mixture tends to be enriched because a portion of the incoming air flowing through the intake passage towards the engine is replaced by the exhaust gases recirculated through the EGR system. Therefore, in this possible arrangement, means are required to compensate for variations in the air-fuel mixing ratio which would result from the recirculation of the exhaust gases.

In order to compensate for variations in the air-fuel mixing ratio resulting from the recirculation of the exhaust gases, the conventional procedure is to calculate according to a control map stored in a computer, the required amount of exhaust gases to be recirculated which is appropriate for a particular engine operating condition on the basis of the parameters representative of such an engine operating condition, and then to control the opening of an EGR control valve disposed on an EGR passage so as to satisfy the required amount of exhaust gases to be recirculated while the rate of supply of fuel to be injected into the intake passage is set to a value corresponding to the amount of the exhaust gases to be recirculated in anticipation that the exhaust gas recirculation would take place as required by the operation of the EGR control valve.

However, since this conventional method is not based on the practical amount of the exhaust gases recirculated, this conventional method involves such a disadvantage that, even though the opening of the EGR control valve is accurately map-controlled, a deviation in the amount of the exhaust gases being recirculated from the required value by reason of, for example, clogging of the EGR passage, results in variations of the air-fuel mixing ratio which ought to have been compensated for. Therefore, with this conventional method, an accurate control of the air-fuel mixing ratio to a stoichiometric value can not be performed.

This disadvantage may be eliminated if the amount of the exhaust gases being actually recirculated is detected so as to provide a reference necessary to determine the rate of supply of the fuel to be injected into the intake passage, or necessary to perform a feedback control to cause the actual amount of exhaust gases recirculated to approximate the required amount of exhaust gases. However, in order to achieve this, the use of an expensive air-flow meter and/or an EGR detecting system for detecting the amount of exhaust gases actually recirculated is required, rendering the system as a whole to be costly.

SUMMARY OF THE INVENTION

Accordingly, the present invention has been developed with a view to substantially eliminate the above described disadvantages and inconveniences and has for its essential object to provide an improved air-fuel ratio control system wherein at least two parameters which are representative of an engine operating condition, such as the engine speed, the negative pressure, and the opening of the throttle valve, are used to calculate the amount of incoming air supplied so as to determine the amount of the fuel to be injected and wherein the air-fuel mixing ratio of the combustible mixture which has been determined by a combination of the amount of incoming air, the amount of fuel injected and the amount of exhaust gases actually recirculated is detected by a composition sensor disposed on the exhaust passage; an output signal from the sensor is used to accurately control the amount of exhaust gases to be recirculated, that is, to institute a feedback control so as to render the amount of exhaust gases to be recirculated to be of a value approximating the required amount of exhaust gases.

For this purpose, in the present invention, a composition sensor which is effective to detect whether the combustible mixture burned in the engine has been enriched or leaned is utilized to detect variations in the air-fuel mixing ratio resulting from the recirculation of the exhaust gases, an output signal of said composition sensor being supplied to a computer as information so that the computer can control the EGR control valve according to such information so as to increase or decrease the amount of exhaust gases to be recirculated in correspondence with the amount of deviation of the actual air-fuel mixing ratio from a predetermined air-fuel mixing ratio, whereby the air-fuel mixing ratio of the combustible mixture to be supplied towards the engine can be controlled to a predetermined or stoichiometric value.

In the present invention, where the automobile engine is operated under a transit operating condition including acceleration and deceleration, the feedback control of the EGR control valve, which is based on the output signal from the composition sensor, is interrupted so as to institute a second control wherein the opening of the EGR control valve is determined according to a predetermined amount of exhaust gases to be recirculated, which is determined in consideration of the operating condition of the engine during the transit operating condition, that is, according to a readout value read out from a memory means in which the opening of the EGR control valve is stored. By so doing, the responsivity of the EGR control valve which tends to be delayed during the feedback control scheme can be improved.

Where the engine is operated under one of particular engine operating conditions wherein the recirculation of the exhaust gases is required to be interrupted or minimized, for example, during a cold start of the engine, a low load operating condition of the engine including idling, or a high load operating condition wherein a relatively high power output is required, by presetting the air-fuel mixing ratio determined by a fuel adjusting means to a lower value than the air-fuel mixing ratio attained during one of engine operating conditions other than the above described particular operating condition, the air-fuel mixing ratio of the combustible mixture to be supplied towards the engine can be adjusted to an optimum value, that is, a predetermined or stoichiometric value, even though the recirculation of the exhaust gases is minimized or interrupted. Accordingly, when the actual air-fuel mixing ratio monitored by the composition sensor deviates from the predetermined value, a slight amount of the exhaust gases being recirculated is sufficient to compensate for such a deviation on the one hand and, on the other hand, during the engine operating condition other than the above described particular operating conditions, the combustible mixture of the air-fuel mixing ratio which has been preset by the fuel adjusting means to a relatively high value is enriched in admixture with relatively large amount of the recirculated exhaust gases so as to attain the predetermined air-fuel mixing ratio. Therefore, the $NO_x$ component contained in the exhaust gases, which tends to be emitted in a relatively large amount during an engine operating condition other than the above described operating conditions can be minimized.

BRIEF DESCRIPTION OF THE DRAWINGS

These other objects and features of the present invention will become clear from the following description taken in conjunction with preferred embodiments of the present invention with reference to the accompanying drawings, in which.

DETAILED DESCRIPTION OF THE INVENTION

Figure 1:
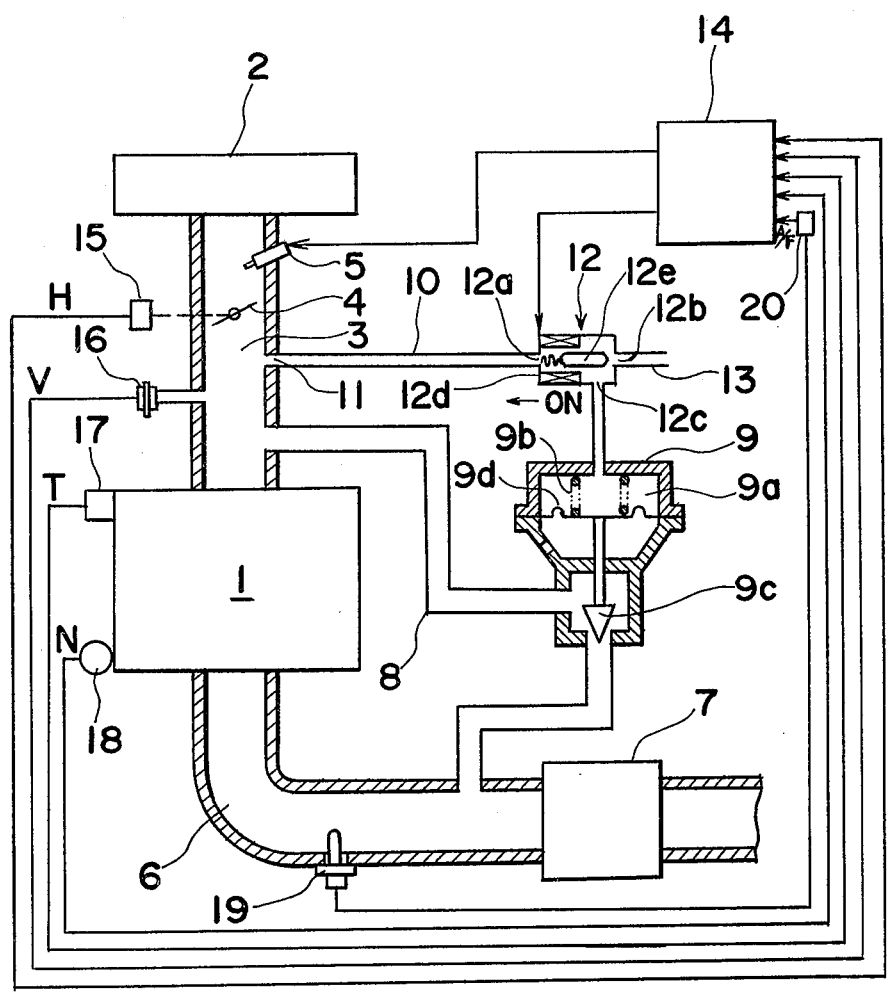
FIG. 1 is a schematic diagram showing an air-fuel ratio control system embodying the present invention.

Before the description of the invention proceeds, it is to be noted that like parts are designated by like reference numerals throughout the accompanying drawings.

Referring first to FIG. 1, an automobile power plant comprises an internal combustion engine 1 having at least one combustion chamber communicated on the one hand to the atmosphere through an intake passage 3 by way of an air cleaner 2 and on the other hand to the atmosphere through an exhaust passage 6 by way of an exhaust gas purifying unit 7 in the form of, for example, a catalytic converter. The intake passage 3 has a throttle valve 4 supported therein for movement between substantially closed and full open positions for regulating the flow of a combustible air-fuel mixture towards the engine 1, and a fuel injection nozzle 5 positioned upstream of the throttle valve 4 with respect to the direction of flow of the air-fuel mixture towards the engine 1 for injecting a mist of fuel into the intake passage 3.

The automobile power plant also comprises an exhaust gas recirculating (EGR) system including an exhaust gas recirculating passage 8 having one end communicated to a portion of the exhaust passage 6 between the engine 1 and the catalytic converter 7 and the other end communicated to the intake passage 3 at a position downstream of the throttle valve 4 with respect to the direction of flow of the air-fuel mixture towards the engine 1, and an EGR control valve 9 in the form of a diaphragm valve assembly installed on the EGR passage 8 for regulating the flow of exhaust gases from the exhaust passage 6 back into the intake passage 3 through said EGR passage 8 in dependence on engine operating conditions as will be described later. The EGR control valve has a working chamber 9a defined in a valve casing by a diaphragm member 9d, said diaphragm member 9d being displaceable to move a valve member 9 which is coupled thereto for movement together with the diaphragm member 9d between opened and closed positions. The EGR control valve 9 also has a biasing spring 9b housed within the working chamber 9a and biasing the diaphragm member 9d to move the valve member 9c to the closed position in which the recirculation of the exhaust gases through the EGR passage 8 is interrupted.

The EGR control valve 9 is controlled by a negative pressure developed inside the intake passage 3 at a position downstream of the throttle valve 4 and, for this purpose, the working chamber 9a of the EGR control valve 9 is communicated through a pressure transmitting passage 10 to a port 11 opening into the intake passage 3 at a position downstream of the throttle valve 4. The pressure transmitting passage 10 has a three-way electromagnetic valve assembly 12 disposed thereon and comprising a valve casing having three ports 12a, 12b and 12c defined therein. The port 12a is in communication with a portion of the pressure transmitting passage 10 adjacent the intake passage 3, the port 12b is in communication with the atmosphere through an air duct 13, and the port 12c is in communication with a portion of the pressure transmitting passage 10 adjacent the EGR control valve 9. The valve assembly 12 also comprises a solenoid 12d and a valve member 12e normally held in position to close the port 12b, but capable of being moved towards the left as viewed in FIG. 1, to close the port 12a when the solenoid 12d is electrically energized in a manner as will be described later. In practice, this three-way electromagnetic valve assembly 12 is so designed as to adjust the magnitude of the negative pressure to be introduced into the working chamber 9a of the EGR control valve 9 by allowing air to enter the pressure transmitting passage 10 during the movement of the valve member 12e from the right towards the left as viewed in FIG. 1 as a result of the energization of the solenoid 12d. Therefore, it has now become clear that the opening of the EGR control valve 9, and thus the effective cross-sectional area of the EGR passage 8, can be adjusted by the magnitude of the negative pressure introduced into the working chamber 9a of the EGR control valve, which magnitude is in turn adjusted by the valve assembly 12.

Both the amount of fuel to be injected into the intake passage 3 through the injection nozzle 5 and the duty cycle of the electromagnetic valve assembly 12, are controlled by a microcomputer 14, wherein the duty cycle represents the ratio, expressed as a percentage, of the time t during which the port 12a is opened relative to the time $\tau$ during which the port 12a is closed, namely $\tau/t \times 100$. The first and second times t and $\tau$ are hereinafter respectively referred to as on-time and off-time of the valve assembly 12.

The air-fuel mixing ratio control system embodying the present invention includes the following sensors, outputs of all of which are supplied to the microcomputer 14 so that the air-fuel mixing ratio of the combustible mixture to be supplied to the engine 1 can be ultimately controlled so as to be a stoichiometric value at all engine operating conditions for the purpose of minimizing both the fuel consumption and the emission of pollutants contained in the exhaust gases:

(a) A throttle sensor 15 for detecting and generating an output signal indicative of the angular displacement of a rotary shaft on which the throttle valve 4 is mounted for rotation together therewith, the angular displacement being a parameter representative of the opening H of the throttle valve 4.

(b) A pressure sensor 16 disposed on the intake passage 3 at a position downstream of the throttle valve 4 for detecting and generating an output signal indicative of the negative pressure V developed inside the intake passage 3.

(c) A temperature sensor 17 for detecting and generating an output signal indicative of the temperature T of a coolant water used to cool the engine 1.

(d) An engine speed sensor 18 operatively coupled to a power output shaft (not shown) of the engine 1 for detecting and generating an output signal indicative of the rotational speed N of the engine; the sensor 18 may be a tachometer.

(e) A composition sensor 19 disposed on the exhaust passage 6 between the engine 1 and the catalytic converter 7 for detecting and generating an output signal indicative of the concentration of a component, for example, oxygen, of the exhaust gases; the concentration is a function of the air-fuel mixing ratio of the combustible mixture which has been burned in the engine 1.

While the output signals from the respective sensors 15, 16, 17 and 18 are directly fed to the microcomputer 14, the output signal A/F from the composition sensor 19 is fed to a comparison circuit which is operable to compare the output signal from the composition sensor 19 with a threshold value representative of a predetermined air-fuel mixing ratio which may be a stoichiometric air-fuel mixing ratio and then to generate a difference signal or air-fuel ratio signal A/F which is applied to the microcomputer 14.

So far as the EGR system is concerned, if the output signal from the composition sensor 19 shows that the combustible mixture burned in the engine 1 has been enriched relative to the stoichiometric air-fuel mixing ratio, then the duty cycle of the electromagnetic valve assembly 12 is adjusted by the microcomputer 14 so as to be increased. The increased duty cycle of the electromagnetic valve assembly 12 allows much air to enter through the port 12b into the passage 10, thereby reducing the negative pressure which has been introduced into the working chamber 9a of the EGR control valve 9. Consequently, as the negative pressure in the working chamber 9a reduces, the biasing spring 9b expands gradually outwardly to displace the diaphragm member 9d to bring the valve member 9c towards the closed position, whereby the rate of flow or recirculation of the exhaust gases from the exhaust passage 6 into the intake passage 3 is decreased while the air entering the passage 10 through the port 12b is introduced into the intake passage 3 at a rate corresponding to the rate of reduction of the flow of the exhaust gases through the EGR passage 8. By so doing, the combustible mixture being supplied towards the engine 1 is leaned so as to attain the stoichiometric value.

On the contrary thereto, should the output signal from the composition sensor 19 show that the combustible mixture burned in the engine 1 has been leaned relative to the stoichiometric air-fuel mixing ratio, the duty cycle of the electromagnetic valve assembly 12 is decreased to thereby allow a more negative pressure to be introduced into the working chamber 9a of the EGR control valve 9. Therefore, in this condition, the diaphragm member 9d is displaced to move the valve member 9c towards the opened position, so that the combustible mixture being supplied towards the engine 1 is enriched in admixture with the recirculated exhaust gas so as to attain the stoichiometric air-fuel mixing ratio.

Figure 2:
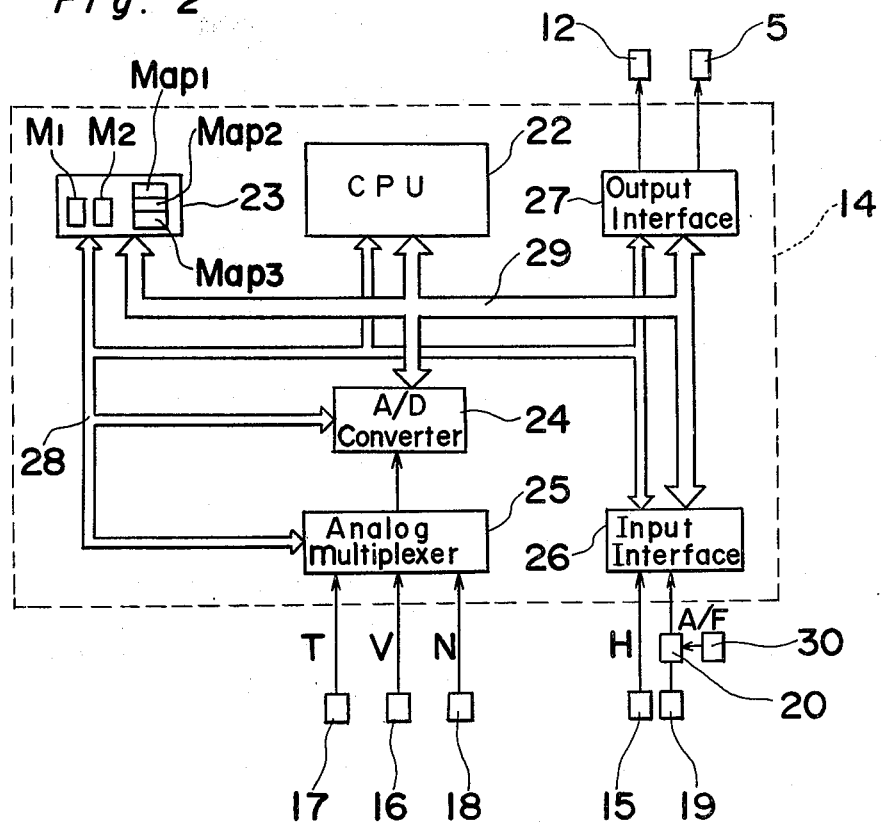
FIG. 2 is a schematic block diagram showing a microcomputer used in the practice of the present invention.

Referring to FIG. 2, the microcomputer 14 comprises a central processing unit 22, a memory 23, an analog-to-digital converter 24, an analog multiplexer 25, an input interface circuit 26 and an output interface circuit 27, all of them are connected by control buses 28, the receipt and delivery of address signals and data signals among these components being performed through address-/data buses 29. This microcomputer 14 is of any known construction and, therefore, the details thereof will not be herein reiterated for the sake of brevity.

As shown in FIG. 2, the respective output signals from the pressure sensor 16, the temperature sensor 17 and the speed sensor 18 are fed to the analog multiplexer 25. The output signals from the sensors 16, 17 and 18 which are fed to the analog multiplexer 25 are occasionally read out therefrom and then fed to the central processing unit 22. On the other hand, both the output signal from the throttle sensor 15 and the air-fuel ratio signal A/F are fed to the input interface circuit 26 and are occasionally fed therefrom to the central processing unit 22.

Figure 3:
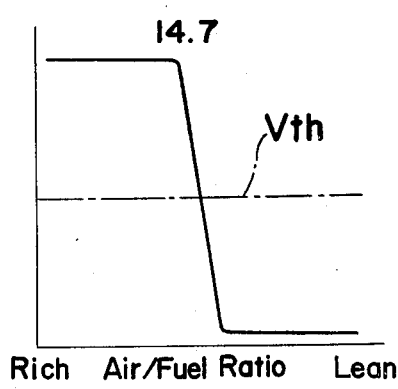
FIG. 3 is a diagram showing the waveform of an output signal from a composition sensor.

In FIG. 2, reference numeral 30 represents a predetermined voltage generator for supplying a voltage signal representative of the threshold value Vth to a comparison circuit 20 whereat the output signal from a composition sensor 19 is compared with the threshold value Vth. The comparison circuit 20 so connected with the predetermined voltage generator 30 serves to determine whether the output signal from the composition sensor 19 is higher or lower than the threshold value Vth as shown in FIG. 3 to find whether the combustible mixture burned in the engine 1 has been enriched or leaned with respect to the stoichiometric air-fuel mixing ratio of, for example, 14.7, the output signal from said comparison circuit 20 being supplied to the microcomputer 14 in the form of the air-fuel ratio signal A/F.

Hereinafter, the manner in which the fuel injection control circuit for the nozzle 5 and the electromagnetic valve assembly 12 are controlled by the microcomputer 14 will be described with particular reference to a flow chart shown in FIG. 4.

Figure 4:
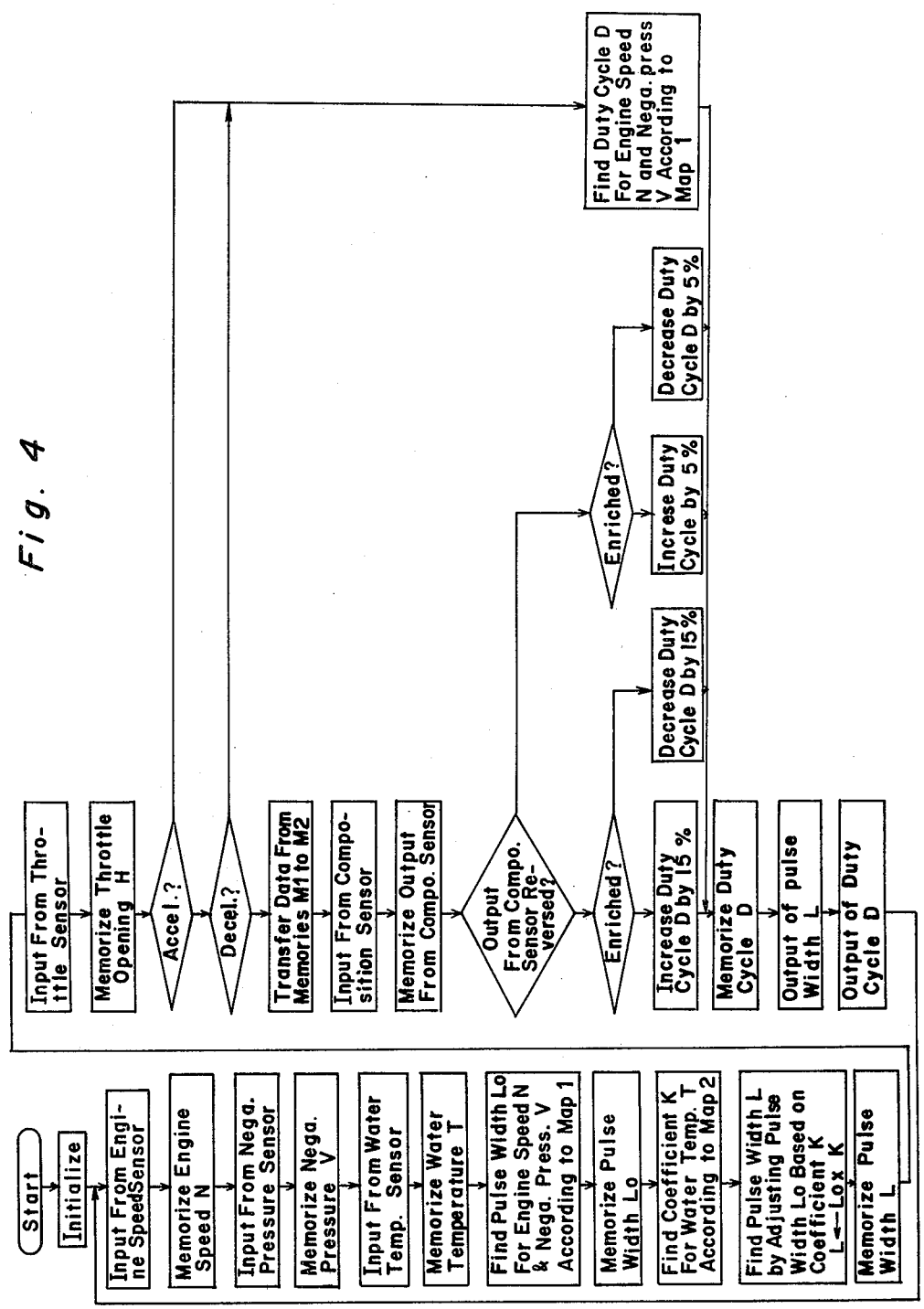
FIG. 4 is a flow chart showing the sequence of control performed by the microcomputer.

Referring to FIG. 4, the microcomputer 14 initialized at the step (1) in response to the application of a start signal thereto and performs the following control process at a predetermined cycle.

In the first place, at the step (2), the output signal from the speed sensor 18 is read in and, subsequently at the step (3), the engine speed N is stored at a predetermined address in a first memory area $M_1$ of the memory 23. Thereafter and until the step (7), the output signals from the respective sensors 16 and 17 are sequentially read in with the negative pressure V and the water temperature T memorized correspondingly in a similar manner.

Figure 5:
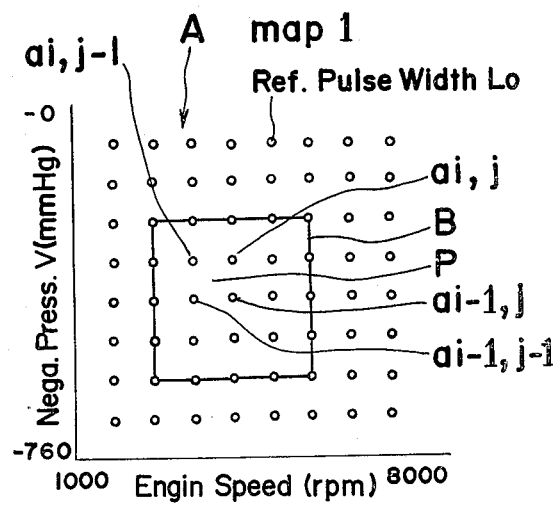
FIG. 5 is an explanatory diagram used to explain a memory Map 1 for setting a reference pulse width to be applied to a fuel injection nozzle.

At the step (8), the width Lo of a reference pulse which provides a reference to a fuel injection control pulse to be applied to the nozzle 5 is calculated from the engine speed N and the negative pressure V on the strength of a stored memory Map 1 as shown in FIG. 5.

The memory Map 1 is a map having a plurality of grid points (ai, j) occupying respective points of intersection of eight lines equally dividing the maximum possible range of variations of the negative pressure V with an equal number of columns equally dividing the range of the engine speed N and wherein the value of fuel injection control pulse width Lo, that is, the amount of fuel to be injected into the intake passage 3 through the nozzle 5, which is determined as appropriate to a particular coordination of the negative pressure V and the engine speed N assigned by the associated grid point (ai, j) is stored at each grid point (ai, j), as shown in FIG. 5. As shown in FIG. 5, in the region shown by A, which represents particular engine operating conditions, that is, an engine cold start, a low load operating condition including engine idling, and a high load operating condition, in which the performance of the engine 1 tends to be adversely affected if the exhaust gas recirculation is performed, the injection control pulse width Lo is so selected that the combustible mixture to be supplied towards the engine 1 can be enriched. On the other hand, in the region shown by B in FIG. 5 which represents an engine operating condition other than that described above, that is, a moderate load operating condition, the injection control pulse width Lo is so selected that the combustible mixture can be leaned. In other words, when the engine operating condition falls in the region A in which the recirculation of the exhaust gases is to be minimized or interrupted, if the air-fuel mixing ratio determined by the microcomputer 14 is preset to a value equal to or slightly higher than the stoichiometric value, a slight amount of the exhaust gases being recirculated is sufficient to adjust the air-fuel mixing ratio being monitored by the composition sensor 19 to the stoichiometric value in the event that the air-fuel mixing ratio monitored by the composition sensor 19 has been displaced from the stoichiometric value.

On the other hand, when the engine operating condition falls in the moderate load region B in which a relatively large amount of $NO_x$ component of the exhaust gases tends to be emitted and, therefore, the suppression thereof is desired, arrangement is made to lean the combustible mixture to be supplied towards the engine 1 to enable a relatively large amount of the exhaust gases to be recirculated into the intake passage 3 so that the air-fuel mixing ratio of the combustible mixture to be subsequently supplied towards the engine 1 can be adjusted to the stoichiometric value with the relatively large amount of the recirculated exhaust gases.

Where the point P assigned by the coordination of the negative pressure V and the engine speed N read out from the central processing unit 22 does not match with the grid point (ai, j) as shown in FIG. 5, the reference pulse width Lo(P) corresponding to the point P can be calculated by interpolation on the basis of the four grid points (ai-1, j), (ai-1, j-1), (ai, j-1) and (ai, j) all surrounding the point P.

Figure 7:
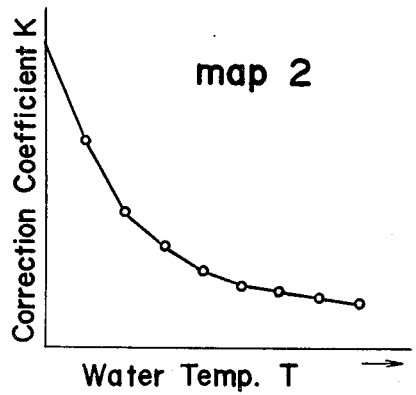
FIG. 7 is an explanatory diagram used to explain a memory Map 2 for the determination of a correction coefficient relative to the reference pulse width.

The reference pulse width Lo(P) so calculated is stored at a predetermined address in the first memory area $M_1$ of the memory 23 during the step (9). At the subsequent step (10), the water temperature T memorized during the step (7) is read out and a correction coefficient K(T) for the water temperature T relative to the reference pulse width Lo(P) is calculated according to a memory Map 2 shown in FIG. 7. The calculated correction coefficient K(T) is then multiplied by the reference pulse width Lo(P), at the step (11), to determine the pulse width $L(=L_0(P) \times K(T))$ of the injection control pulse to be actually applied to the fuel injection nozzle 5, which pulse width L is temporarily stored at a predetermined address in the first memory area $M_1$ of the memory 23 during the step (12).

By so doing, the determination of the injection control pulse width L is completed, and the microcomputer starts the calculation of the duty cycle D of the electromagnetic valve assembly 12.

For this purpose, at the step (13), the output signal from the throttle sensor 15 is read in, and at the step (14), the opening H of the throttle valve 4 is stored at a predetermined address in the first memory area $M_1$ of the memory 23.

The opening H of the throttle valve 4 so stored is compared with the previous opening H' of the throttle valve 4 which has been stored at a predetermined address in a second memory area $M_2$ of the memory 23. This is carried out at the steps (15) and (16). Specifically, if the engine 1 is operated under a normal operating condition wherein the throttle opening H remains the same as the previous throttle opening H', the process proceeds in a first EGR control means including the step (17) to the step (26). On the other hand, if the engine 1 is operated under a transit condition including acceleration and deceleration in which the throttle opening H is larger and smaller than the previous throttle opening H', respectively, the process proceeds to a second EGR control means constituted by the step (27).

In the first EGR control means, at the step (17), data such as the engine speed N, the negative pressure V, the water temperature T, the reference pulse width $L_o$, the correction coefficient K, the injection control pulse width L, etc., which have been stored in the first memory area $M_1$ of the memory 23 are transferred to the second memory area $M_2$ which is separately provided in the memory 23.

The air-fuel ratio signal A/F from the comparison circuit 20 is read in at the step (18) and is subsequently, i.e., at the step (19), stored in the first memory area $M_1$. At the step (20), the air-fuel ratio signal so stored is compared with the previously stored air-fuel ratio signal, which has been transferred to the second memory area $M_2$, to determine whether or not the air-fuel mixing ratio has been reversed. If it is found that the air-fuel mixing ratio has not been reversed, the step (20) is followed by the step (21), but it has been found that the air-fuel mixing ratio has been reversed, the step (20) is followed by the step (24). At any one of the steps (21) and (24), the combustible mixture burned in the engine is checked as to whether it has been enriched.

Figure 6:
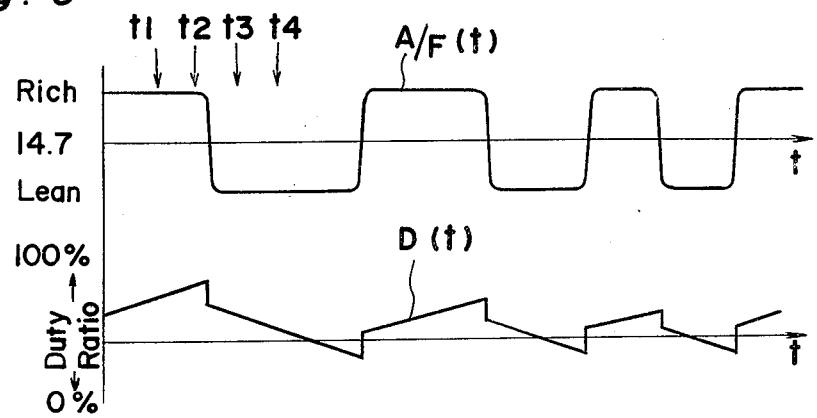
FIG. 6 is a graph showing the relationship between variation in an air-fuel ratio signal and corresponding variation in the duty cycle of an electromagnetic valve assembly.

Specifically, assuming that the air-fuel ratio signal A/F ($t_1$) read in at a timing $t_1$ shown in FIG. 6 as well as the air-fuel ratio signal A/F ($t_2$) read in a timing $t_2$ shows that the combustible mixture burned in the engine 1 has been enriched, and assuming that the increment of the previous duty cycle $D(t_1)$ of the electromagnetic valve assembly 12 during a period from the timing $t_1$ to the timing $t_2$ has been, for example, 5%, then the succeeding duty cycle $D(t_2)$ is set to a value increased by the increment of 5% relative to the previous duty cycle $D(t_1)$. That is, $D(t_2)=1.05 \times D(t_1)$.

It is to be noted that, where both of the previous air-fuel ratio signal A/F($t_3$) and the next succeeding air-fuel ratio signal A/F($t_4$) at respective timings $t_3$ and $t_4$ in FIG. 6 show that the combustible mixture has been leaned, the decrement is assumed to be 5% and the next succeeding duty cycle $D(t_4)$ is reduced by the decrement of 5% relative to the previous duty cycle $D(t_4)$. That is, $D(t_4)=0.95 \times D(t_3)$.

On the other hand, where as shown at respective timing $t_2$ and $t_3$ in FIG. 6 the previous air-fuel ratio signal A/F($t_2$) and the next succeeding air-fuel ratio signal A/F($t_3$) are in reversed relation to each other, showing that the combustible mixture has been enriched and leaned at the respective timings $t_2$ and $t_3$, at the step (25), the decrement incident to the reversion of the air-fuel mixing ratio during the period from the timing $t_2$ to the timing $t_3$ is assumed to be, for example, 15% and the next succeeding duty cycle $D(t_3)$ is set to a value reduced by the decrement of 15% relative to the previous duty cycle $D(t_2)$. That is, $D(t_3)=0.85 \times D(t_2)$.

On the contrary thereto, where the air-fuel ratio signal A/F(t) which has shown that the combustible mixture had been leaned is reversed to show that the combustible mixture has been enriched, the next succeeding duty cycle is set to a value increased by the increment of 15% relative to the previous duty cycle. That is, $D(t_3)=1.15 \times D(t_2)$.

Figure 8:
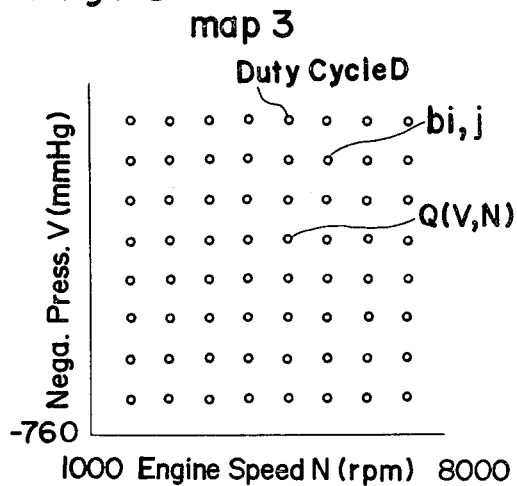
FIG. 8 is an explanatory diagram used to explain a memory Map 3 for the determination of the duty cycle of the electromagnetic valve assembly during one of acceleration and deceleration of the engine.

On the other hand, during the transit operating condition of the engine, that is, after the engine 1 has accelerated and decelerated as determined at the respective steps (15) and (16), a map-control is performed by the second EGR control means at the step (27) instead of the feedback control (the setting of the duty cycle) in dependence on the composition signal from the composition sensor 19. The map-control referred to above is such that the duty cycle D of the electromagnetic valve assembly 12 is controlled by the microcomputer according to a memory Map 3 shown in FIG. 8.

The memory Map 3 is similar to the memory Map 1 shown in FIG. 5 and is a map in which a plurality of predetermined duty cycles D of the electromagnetic valve assembly 12 appropriate to the engine operating conditions are preset at respective grid points (bi, j) assigned by associated coordinations of the negative pressure V and the engine speed N. It is to be noted that, where the point Q(V, N) assigned by a particular coordination of the memorized negative pressure V and engine speed N does not match with the grid point (bi, j), the necessary duty cycle D can be calculated by interpolation on the basis of the four grid points surrounding the point Q(V, N) in a manner similar to the calculation by interpolation of the reference pulse width described with reference to FIG. 5.

The reason for the transfer from the feedback control scheme performed by the first EGR control means in dependence on the output signal from the composition sensor 19 to the map-control scheme performed by the second EGR control means according to the memory Map 3, said transfer taking place when the engine 1 starts either an acceleration or deceleration, that is, during the transit operating condition, is that the feedback control scheme can not quickly respond to the transitory operating condition in which the negative pressure V and/or the engine speed N varies abruptly and unusually and, therefore, there is a possibility of a delayed response. On the contrary, the control performed by the second EGR control means according to the memory Map 3, is effective to respond at each occasion to the engine operating conditions and, therefore, the response during the transitory operating condition can accurately be ensured without any delay.

The duty cycle so determined at any one of the steps (22), (23), (25), (26) and (27) in the manner as hereinbefore described is stored in the first memory area $M_1$ at the step (28).

Thereafter, the injection control pulse width L stored in the first memory area $M_1$ is read out at the step (29) and is supplied by the output interface circuit 27 to the fuel injection nozzle 5 so that the fuel can be injected into the intake passage 3 through the nozzle 5 for a period of time equal to the injection control pulse width L to such an extent as required to render the air-fuel mixing ratio of the combustible mixture to be equal to the stoichiometric value.

At the step (30), the signal indicative of the duty cycle D so determined in the manner described hereinbefore is applied through the output interface circuit 27 to the solenoid 12d of the electromagnetic valve assembly 12 to control the latter according to such a duty cycle so that the air-fuel mixing ratio of the combustible mixture mixed with the recirculated exhaust gases can be set to a value substantially equal to the stoichiometric value.

In the control system as hereinbefore described, where the engine operating condition falls in the region A, wherein the exhaust gas recirculation is required to be minimized or interrupted, since the air-fuel mixing ratio of a fuel adjusting means determined by the microcomputer 14 is set to such a value required for the combustible mixture to be enriched to attain the stoichiometric value, a slight amount of the recirculated exhaust gases is sufficient to compensate the air-fuel mixing ratio for a variation from the stoichiometric value even though the air-fuel mixing ratio of the combustible mixture being monitored by the composition sensor 19 has deviated from the stoichiometric value. On the other hand, where the engine 1 is operated under any one of the engine operating conditions other than that falling in the region A, a relatively large amount of the exhaust gases is recirculated into the intake passage 3 to suppress the emission of the $NO_x$ component of the exhaust gases and, at the same time, to compensate the air-fuel mixing ratio for a variation from the stoichiometric value. In view of the above, the control system according to the present invention is effective to improve the drivability of the engine during any one of the engine operating conditions and also to compensate the air-fuel mixing ratio for a variation from the stoichiometric value irrespective of the engine operating condition.

Figure 9:
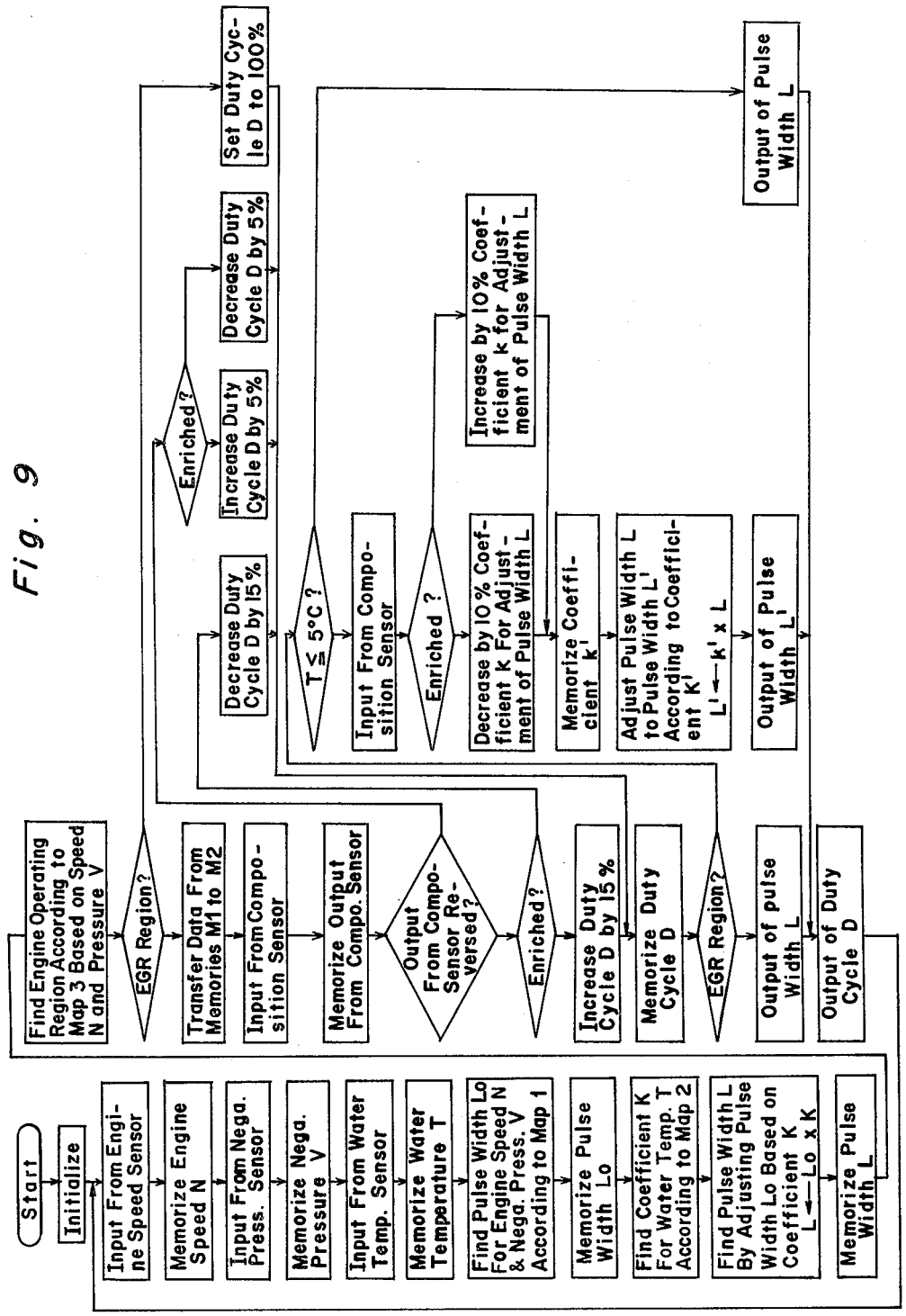
FIG. 9 is a chart similar to FIG. 4, but showing a modified sequence of control performed by the microcomputer.

In a second preferred embodiment of the present invention in which the microcomputer performs a control process in a manner as shown in a flow chart of FIG. 9, the throttle sensor 15 which has been described as employed in the foregoing embodiment is not employed and, therefore, no output signal indicative of the opening of the throttle valve 4 is supplied to the microcomputer 14. In view of the omission of the throttle sensor, the determination of whether or not the engine is accelerating or decelerating, such as effected in the foregoing embodiment, is not carried out and therefore, even though the memory Map 1 used is similar to that shown in FIG. 5, no distinction between the regions A and B shown in FIG. 5 appear.

It is, however, to be noted that the control process performed by the microcomputer 14 from the step (1) to the step (12) is identical to that in the foregoing embodiment as can readily be understood from the comparison of the flow chart of FIG. 9 with that of FIG. 5 and, therefore, only the control process subsequent to the step (13) will be described for the sake of brevity.

Referring to FIG. 9, subsequent to the determination of the injection control pulse width L and at the step (13), data such as the engine speed N, the negative pressure V and the water temperature T, which are all stored in the first memory area $M_1$, are read out to find the engine operating condition according to the memory Map 3, i.e. to determine from the memory Map 3 whether the engine operating condition falls in a region required for the exhaust gas recirculation to be effected or whether the engine operating condition falls in a specific region required for the exhaust gas recirculation to be interrupted.

Figure 10:
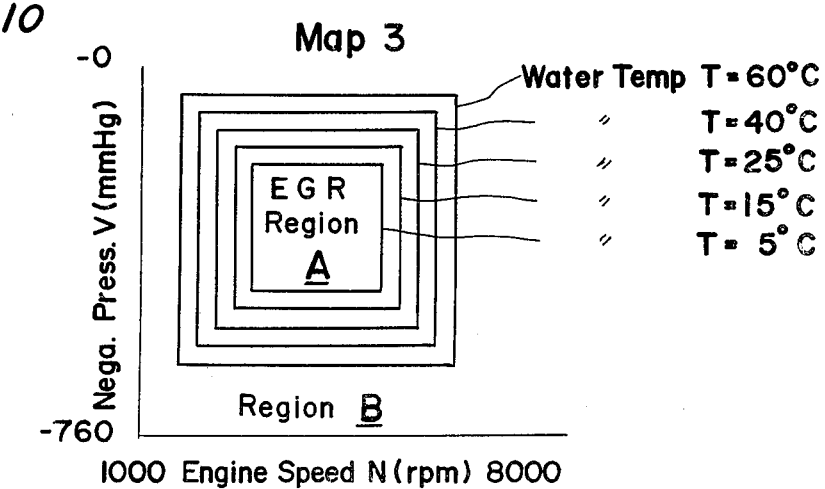
FIG. 10 is an explanatory diagram used to explain a memory Map 3 for setting EGR and EGR-cut regions of engine operating conditions, which memory Map 3 is used in connection with the flow chart of FIG. 9.

The memory Map 3 used in this embodiment is shown in FIG. 10 and is a map having an EGR region A in which the moderate load operating condition of the engine 1 falls and an EGR-cut region B in which both of the low load and high load operating conditions of the engine 1 fall, said EGR-cut region B being defined externally of the EGR region A. It is to be noted that the EGR region A and the EGR-cut region B gradually enlarges and correspondingly decreases, respectively, with increase of the water temperature T.

If the engine operating condition is determined at the step (14) as falling in the EGR region A, the step (14) is followed by the step (15) from which the EGR control means performs a control so as to feed back to the EGR control valve 9. On the contrary, if the engine operating condition is determined at the step (14) as falling in the EGR-cut region B, the step (14) is followed by the step (25).

The control process from the step (15) to the step (24) shown in FIG. 9 is identical with that from the step (17) to the step (26) shown in FIG. 4 and, therefore, the description of the control process from the step (15) to the step (24) is herein omitted for the sake of brevity, it being, however, to be noted that the steps (15) to the step (24) shown in FIG. 9 correspond respectively to the step (17) to the step (26) shown in FIG. 4.

When the engine operating condition is found falling in the EGR-cut region B in the manner as hereinbefore described, the duty cycle D of the electromagnetic valve assembly 12 is set to 100% at the step (25), thereby causing the EGR control valve 9 to close so as to interrupt the exhaust gas recirculation.

In other words, during the engine operating condition falling in the EGR-cut region B, the emission of the $NO_x$ component is usually small and, therefore, the interruption of the exhaust gas recirculation brings no effect. However, if the exhaust gas recirculation is effected during such engine operating condition falling in the region B, the combustibility of the combustible mixture in the engine will be adversely affected particularly during the low load operating condition with a consequently increased emission of HC and CO components of the exhaust gases and the power output performance of the engine will be adversely affected, particularly during the high load operating condition.

The duty cycle D of the electromagnetic valve assembly 12, which has been determined at any one of the steps (20), (21), (22), (23) and (25) shown in FIG. 9, is stored in the first memory area $M_1$.

In the embodiment shown in FIG. 9, where the duty cycle D of the electromagnetic valve assembly 12 is determined to be 100% at the step (25) so as to interrupt the exhaust gas recirculation, the following control process is performed to check whether or not adjustment is necessary of the injection control pulse width L which has once been determined and, if the necessity arises, the injection control pulse width L is adjusted in dependence on the output signal from the composition sensor 19, that is, a feedback control is performed.

Referring still to FIG. 9, at the step (27), a check is made as to whether the engine is in the EGR region A or in the EGR-cut region B, and where the engine operating condition falls in the EGR region A, the injection control pulse of the pulse width L stored at the step (28) is supplied to the injection nozzle 5 without being adjusted so that the nozzle 5 can inject fuel into the intake passage for a period of time equal to the injection control pulse width L.

On the other hand, where the engine operating condition falls in the EGR-cut region, a check is made at the step (29) as to whether or not the water temperature T is equal to or higher than a predetermined temperature of, for example, 5° C. Where the water temperature T has been found to be equal to or higher than the predetermined temperature of 5° C., a check is made as to the presence and absence of the air-fuel ratio signal A/F and, in other words, the output signal from the composition sensor 19 at the step (30) issued as an air-fuel ratio control means and, subsequently, a check is made at the step (31) as to whether the combustible mixture burned in the engine has been enriched or leaned.

Where the combustible mixture has been found enriched, a correction coefficient k for the reference pulse width L is decreased by the decrement of 10% and is adjusted by integration to a value k' (i.e., $k' = 0.9 \times k$) at the step (32). On the contrary, where the combustible mixture has been found leaned, the correction coefficient k is increased by the increment of 10% and is adjusted by integration to a value k' (i.e., $k' = 1.1 \times k$) at the step (33). The correction coefficient k', which has been determined at either one of the steps (32) and (33) is stored in the first memory area $M_1$ at the step (34), and at the subsequent step (35), the injection control pulse width L' to be substituted for the injection pulse width L determined at the step (11) is calculated by the formula, $L' = k' \times Lo$. An injection control pulse of the calculated pulse width L' is fed from the microcomputer 14 to the injection nozzle 5 at the step (36).

Where the water temperature T has been found to be lower than 5° C., the step (29) is followed by the step (37) whereat the injection control pulse of the pulse width L determined at the step (11) is supplied to the injection nozzle 5 without being modified.

Subsequent to either one of the steps (28), (36) and (37), an output signal which is indicative of the duty cycle D and which has been stored in the first memory area $M_1$ at the step (26) is supplied to the electromagnetic valve assembly 12 so as to cause the latter to operate according to the duty cycle D which has been so determined.

As has now become clear from the foregoing description, the control process according to the embodiment of the present invention shown in FIGS. 9 and 10, is such that the memory Map 3 is utilized to determine whether the engine operating condition falls in the EGR region or in the EGR-cut region (a specific operating region) and, where the engine operating condition has been found to fall in the EGR region, the exhaust gas recirculation control means is formed for adjusting the air-fuel mixing ratio to the stoichiometric value by the feedback control subjected to the rate of recirculation of the exhaust gases with the duty cycle of the electromagnetic valve assembly 12 determined subsequent to the step (15) and during the process from the step (21) to the step (24) in dependence on the output signal from the composition sensor 19 whereas, where the engine operating condition has been found to fall in the EGR-cut region, the air-fuel ratio control means is formed for adjusting the air-fuel mixing ratio to the stoichiometric value according to a feedback control scheme by setting the injection control pulse width L' for the fuel injection nozzle 5 in dependence on the output signal from the composition sensor 19 subsequent to the step (29), particularly during the step (36) subsequent to the step (30).

Although the present invention has been fully described above, it is to be noted that various changes and modifications are apparent to those skilled in the art. Such changes and modifications are to be understood as included within the true scope of the present invention unless they depart therefrom.

We claim:

1. An air-fuel ratio control system for an internal combustion engine of a type having a fuel injection system, said control system comprising, in combination:
    a fuel intake passage means for the introduction of air into said engine;
    a throttle valve disposed in said fuel intake passage means for regulating the flow of air flowing therethrough towards said engine;
    a fuel injection nozzle disposed in said fuel intake passage means for injecting a mist of fuel thereinto for the preparation of a combustible mixture with said air flowing therethrough;
    an exhaust passage means for the discharge of exhaust gases from said engine towards the atmosphere;
    an EGR passage means communicating between said exhaust passage means and said intake passage means for recirculating a portion of said exhaust gases from said exhaust passage means into said intake passage means;
    an EGR control valve means disposed in said EGR passage means for controlling the rate of recirculation of that portion of said exhaust gases which flow through said EGR passage means;
    a detecting means for detecting the rate of flow of air through said intake passage means in dependence on at least two of signals which are respectively indicative of engine speed, an opening of said throttle valve and a negative pressure developed inside said intake passage means at a position downstream of said throttle valve with respect to the direction of flow of said mixture towards said engine;
    a setting means operable during said recirculation of that portion of said exhaust gases and in response to an output signal from said detecting means for setting the rate of flow of fuel to be injected to a value which is required to lean said combustible mixture to such an extent as to be compensated for by the rate of flow of said exhaust gases recirculated into said engine in dependence on said detected rate of flow of said air;
    a first means for controlling the rate of flow of fuel to be injected in response to an output from said setting means;
    a composition sensor disposed in said exhaust gas passage means for detecting the concentration of a component of said exhaust gases which is a function of the air-fuel mixing ratio of said combustible mixture burned in said engine;
    a second means for controlling the opening of said EGR control valve means in response to an output signal from said composition sensor, said output signal from said composition sensor being supplied only to said second controlling means so as to enable said second controlling means to control said EGR control valve means so as to allow the passage of said exhaust gases recirculated at a rate of flow which is required to adjust said mixing ratio to a required value; and an EGR control means and a memory means for controlling said EGR control valve means in dependence on a control value which is stored in said memory means by detecting a transit operating condition of said engine, said transit operating condition including acceleration and deceleration of said engine.

2. A control system as claimed in claim 1, wherein said fuel injection system comprises a fuel adjusting means for controlling the amount of fuel to be injected through said fuel injection nozzle into said intake passage means in dependence on the rate of flow of air detected by said detecting means, said fuel adjusting means being operable to cause the air-fuel mixing ratio of said combustible mixture, which is to be supplied to said engine when said engine's operating condition falls in a particular region, to be smaller than that which is to be supplied to said engine when said engine's operating condition falls in another region other than said particular region.

3. A control system as claimed in claim 2, wherein said particular region includes a cold start of said engine.

4. A control system as claimed in claim 2, wherein said particular region includes a low load operating condition including engine idling.

5. A control system as claimed in claim 2, wherein said particular region includes a high load operating condition.

* * * * *